United States Patent Office 3,658,888
Patented Apr. 25, 1972

3,658,888
PROCESS FOR PREPARING VINYL ACETATE
Lothar Hornig, Frankfurt am Main, Hans Fernholz, Fischbach, Taunus, Hans-Joachim Schmidt, Frankfurt am Main, Friedrich Wunder, Florsheim (Main), and Therese Quadflieg, Kelkheim, Taunus, Germany, assignors to Farbwerke Hoechst Aktiengesellschaft vormals Meister Lucius & Bruning, Frankfurt am Main, Germany
No Drawing. Filed Mar. 21, 1968, Ser. No. 714,760
Claims priority, application Germany, Mar. 22, 1967, F 51,902
Int. Cl. C07c 67/04
U.S. Cl. 260—497 A
4 Claims

ABSTRACT OF THE DISCLOSURE

Vinyl acetate is prepared from ethylene, oxygen and acetic acid in the gaseous state in the presence of palladium compounds and acetates of metals of the main group 1 and/or the group 2 of the Periodic Table by additionally feeding to the reaction zone small amounts of the catalytically active acetates.

---

The present invention provides a process for preparing vinyl acetate.

It is known that vinyl acetate can be prepared from ethylene, acetic acid and molecular oxygen in the gaseous state in the presence of catalysts containing compounds of palladium. For example, according to German patent application No. 1,191,366 laid open to public inspection, vinyl acetate is prepared by passing ethylene, oxygen and vapors of acetic acid over the catalyst containing, in addition to palladium acetate, alkali metal acetates and Redox compounds such as iron acetate. French Pat. No. 1,407,526 mentions palladium compounds together with alkali metal- and alkaline earth metal acetates as catalytic substances for obtaining vinyl acetate in the gaseous state, whereas German Pat. No. 1,211,637 discloses palladium oxide, if desired together with acetates of secondary group 2 of the Periodic Table, as suitable catalysts for the preparation of vinyl acetate. It is furthermore known that the presence of alkali metal or alkaline earth metal acetates or acetates of zinc and cadmium in the catalyst system exercises a favorable influence on the activity and the life of the above-mentioned catalyst systems.

When those processes are carried out, it appears, however, that after some time, the activity of the catalysts decreases and, simultaneously, the selectivity as to the formation of vinyl acetate is reduced so that it is necessary, for example, to regenerate the catalyst after a relatively short period of operation.

We have now found that these difficulties in preparing vinyl acetate from ethylene, molecular oxygen and acetic acid in the gaseous state in the presence of a catalyst consisting of compounds of palladium and containing acetates of the main group 1 and/or of the group 2 of the Periodic Table as well as, if desired Redox systems, can be overcome by feeding in the reaction zone small amounts of the catalytically active acetates in addition to the reaction components.

It is advantageous to feed the acetates to be added together with one or more reaction components, preferably with acetic acid, to the catalyst at such a rate as the catalyst is depleted of catalytically active acetate during the reaction.

The catalytically active acetates are, for example, the acetates of lithium, sodium, potassium, rubidium, cesium, calcium, strontium, barium, zinc, cadmium, iron and palladium, in particular the acetates of lithium, sodium, potassium, zinc and cadmium. The aforesaid acetates may be fed in the reaction zone in different ways:

For example, the acetates may be injected in a solution, for example as an aqueous solution or a solution of acetic acid, into the hot gas stream consisting of one or more reaction components and/or of an inert gas stream, such as carbon oxides, nitrogen or saturated hydrocarbons. It is also possible to feed the aforesaid solution in a liquid form directly to the catalyst. The reaction gases and/or an inert gas stream may, however, also be brought into contact, partially or totally, with a solution of the acetates at an elevated temperature, prior to entering the reaction zone. For example, these gases may be passed, totally or partially, through or over a solution containing the catalytically active acetates. In an especially suitable embodiment of the invention, the acetates are brought into contact, in the solid state, with part of the reaction gases or with the whole reaction gas stream at an elevated temperature, prior to entering the zone that contains the catalyst. In this case, the catalytically active acetates or the compounds of said metals which form acetates in the presence of acetic acid, such as oxides, hydroxides, carbonates, silicates, phosphates, may be present on an inert carrier material, for example silicic acid. It is suitable to allow the hot gases, prior to entering the catalyst zone, to pass totally or partially over or through one or more of the aforesaid solid metal compounds.

The carrier material containing acetate may be outside or inside the reactor containing the catalyst and may be arranged in such a manner that the gaseous reaction components are passed first over the acetate zone, then over the catalyst zone. The temperatures in the two zones may be different.

The catalytically active acetates may be introduced into the reaction zone continuously or discontinuously, the amount of acetate added to the catalyst depending on the mode of addition. For the preferably continuous feed of the acetates, the amount is in the range of from 0.1 to 400 p.p.m., preferably from 1 to 100 p.p.m., calculated on acetic acid used; it may, however, also be less or more than mentioned above depending on the reaction conditions. A discontinuous feed of the acetates to the reaction zone requires larger amounts of acetate depending on the length of the intervals.

The process of the invention relates to the preparation of vinyl acetate in the gaseous or vaporous phase from ethylene, acetic acid and molecular oxygen in the presence of compounds of palladium as catalysts. Suitable compounds are, for example, palladium acylates, such as palladium propionate and palladium isobutyrate, the palladium salt of cyclohexane-carboxylic acid, palladium benzoate, especially palladium acetate; moreover palladium oxide, palladium oxide-hydrates (compounds in which palladium is linked to oxygen and hydroxyl groups) and salts of palladium with inorganic acids, such as palladium nitrate and palladium sulfate. Complex compounds of palladium, for example compounds of alkali metal- and palladium acylates, may also be used as catalysts. The palladium compounds may be brought into contact with the reaction components separately, advantageously however, in the presence of a carrier material to which they are applied in a finely divided form.

As carrier materials there are suitable, for example, aluminium oxide, asbestos, carbon, zeolites, pumice, clays, feldspars, molecular sieves, silicic acid, kieselguhr and silicon carbide.

The noble metal compounds may be applied to the carrier material by known methods, for example by impregnating the carrier material with a solution of the noble metal salt and subsequently removing the solvent partially or totally. Another mode of preparation consists of certain compounds of palladium being formed on the carrier material, for example oxide-hydrates or oxides are prepared by saponifying palladium chloride, by subjecting palladium nitrate to a thermal degradation or by oxidizing palladium.

In addition to palladium compounds, the catalyst may also contain small amounts, for example of up to 50 mol percent, of other metal compounds which, as such, do not have a catalytic activity, for example the oxides, oxide-hydrates or salts of platinum, gold, silver, copper, iron, manganese, aluminum, titanium, antimony and bismuth. In many cases, it is especially advantageous to use compounds of metals which simultaneously have several valencies under the reaction conditions, i.e. which are known as Redox systems, for example salts of copper lead, cerium, vanadium, tellurium, chromium, molybdenum, manganese and iron. Thus, the catalyst may contain, for example, gold oxide, platinum oxide, copper acetate, silver propionate, iron acetate or manganese phosphate.

The concentration of the palladium compound on the carrier material may vary within wide limits. In many cases, extremely low concentrations of these compounds, for example in the range of from 0.1 to 10% by weight, calculated on the total weight of the system consisting of carrier material and catalyst, are already effective. Vinyl acetate is, however, also obtained using concentrations less than 0.1% by weight. Good results are, of course, also possible to use mixtures of the palladium compounds as catalysts.

In addition to the palladium compound, the catalyst contains acetates of the main group 1 and/or group 2 of the Periodic Table, especially acetates of lithium, potassium, sodium, zinc and cadmium. It may, however, also contain compounds of these elements, such as alkali metal phosphates, alkaline earth metal carbonates, which can be converted into the corresponding acetates by a treatment with acetic acid. The acetate content of the catalyst is advantageously in the range of from 0.1 to 20, preferably from 0.5 to 10 percent by weight. The acetals introduced into the reaction zone, for example together with the reaction gas stream, are suitably the same as already contained in the catalyst as catalytically active acetates.

It is advantageous to use the acetic acid in the highest possible concentration, for example as glacial acetic acid. Small amounts of water are, however, not detrimental. For example, vinyl acetate is also formed using acetic acid having about 90% strength. Mixtures of acetic acid and acetic anhydride may also be used. The acetic acid to be used may already contain catalytically active acetates.

Oxygen may be fed in the elementary form or even in the form of air. When the reaction components are recycled, it is most suitable to use pure or almost pure oxygen. The starting materials may also contain other substances which are not detrimental to the recovery of vinyl acetate, for example saturated hydrocarbons, noble gases and carbon oxides. The reaction components are suitably introduced into the reaction zone after having been evaporated.

Vinyl acetate can be prepared under atmospheric or superatmospheric pressure or under reduced pressure. The pressure is advantageously in the range of from 1 to 50, especially from 1 to 20, atmospheres gage and the temperature is in the range of from 80 to 300° C., preferably from 120 to 220° C.

The mixing ratio of the separate reaction components may vary within wide limits. In carrying out the process of the invention on an industrial scale, care has to be taken that the mixing ratio of the components are beyond the explosion limits. The unreacted components ethylene, acetic acid and oxygen, are suitably recycled after the carbon oxides formed as by-products have partially or totally been separated.

The reaction mixture leaving the reaction zone may be worked up by known methods, for example by distilling the condensate containing vinyl acetate, acetic acid and water and formed after cooling.

Compared with the hitherto known processes for preparing vinyl acetate in the gaseous phase in the presence of noble metal compounds, especially palladium compounds, the process of the invention comprising the feed of catalytically active acetates to the reaction zone, is distinguished by the fact that the catalyst is not depleted of acetates. This fact imparts a considerably prolonger life to the catalysts without reducing their activity or affecting their selectivity.

The following examples serve to illustrate the invention, but they are not intended to limit it thereto.

EXAMPLE 1

(a) 131 grams=250 milliliters of a silicic acid carrier material were impregnated with a solution of 2.5 grams of palladium acetate, 0.5 gram of iron acetate and 5 grams of potassium acetate in 100 milliliters of acetic acid and then dried. Under a pressure of 5 atmospheres gage and at a temperature of 160° C., 113 grams of acetic acid having 99% strength, 94 standard liters of ethylene and 48 standard liters of air were passed over the catalyst thus obtained. There was obtained a space-time yield of 88 grams per hour of vinyl acetate. After an operation period of 63 days, the yield of the catalyst had decreased to 28 grams per l./hour of vinyl acetate.

(b) Under the same conditions as disclosed under (a), a layer of a silicic acid carrier material impregnated with potassium acetate (20 grams potassium acetate per 100 grams of silicic acid) was arranged in front of the catalyst. After 63 days, the space-time yield of the catalyst was still 83 grams per l./hour of vinyl acetate.

EXAMPLE 2

(a) 131 grams=250 milliliters of a silicic acid carrier material was impregnated with a solution of 2.5 grams of palladium acetate, 5 grams of cadmium acetate and 0.5 gram of iron acetate in 100 milliliters of acetic acid and then dried. Under a pressure of 5 atmospheres gage and at a temperature of 180° C., 225 grams of glacial acetic acid, 162 standard liters of ethylene and 100 standard liters of air were passed over this catalyst. There was obtained a space-time yield of 186 grams per l./hour of vinyl acetate. After 120 days, the yield had decreased to 96 grams per l./hour of vinyl acetate.

(a) Under the same test conditions as disclosed under (a), a solution of 0.28 gram of cadmium acetate in 40 milliliters of acetic acid was sprayed onto the catalyst every 10 days. After 120 days, the yield of the catalyst still was 174 grams per l./hour of vinyl acetate.

EXAMPLE 3

(a) 131 grams=250 milliliters of a silicic acid carrier material were impregnated with a solution of 2.5 grams of palladium acetate and 5 grams of sodium acetate in 100 millliliters of acetic acid and then dried. Under a pressure of 5 atmospheres gage and at a temperature of 160° C., 113 grams of glacial acetic acid, 94 standard liters of ethylene and 48 standard liters of air were passed over this catalyst. There was obtained a space-time yield of 45 grams per l./hour of vinyl acetate. After an operation period of 30 days, the yield had decreased to 17 grams per l./hour of vinyl acetate.

(b) Under the same conditions as disclosed under (a), there was used an acetic acid in which from 60 to 80 milligrams of sodium acetate per liter were dissolved. After an operation period of 30 days, the space-time yield still was 45 grams per l./hour of vinyl acetate.

EXAMPLE 4

(a) 10.2 grams of palladium nitrate dissolved in dilute nitric acid were applied to 700 milliliters of a sinter-resistant silicic acid shaped as balls (medium diameter 3.5 millimeters) and containing 0.5% by weight of gold oxide. The substance containing nitrate was then heated, while admitting air, to a temperature in the range of from 400 to 500° C. for about 10 hours. 325 milliliters of the nitrate-free catalyst were impregnated with a concentrated solution of 3.5 grams of sodium acetate and 0.7 gram of zinc acetate in acetic acid. After the excess of acetic acid had been removed under reduced pressure, the catalyst was dried at 170° C. for 5 hours and then filled into a heatable steel reactor having an internal diameter of 25 millimeters. Under a pressure of 6 atmospheres gage and at a temperature of 180° C., 1.3 mols of vaporous acetic acid were passed, per hour, over 150 milliliters of the silicic acid that had been used for preparing the catalyst and that contained 10 grams of sodium acetate and 2 grams of zinc acetate, then mixed with 72 standard liters of ethylene and 10 standard liters of oxygen and the mixture was fed in the catalyst zone of the reactor. The temperature in the reactor was 175° C. and the pressure was 6 atmospheres gage.

The gas mixture leaving the reactor was cooled and the vinyl acetate obtained in the condensate formed was separated by distillation from unreacted acetic acid and from the water formed during the reaction. The unreacted starting products were recycled to the reactor. After an operation period of about 17 days, the silicic acid only charged with sodium acetate and zinc acetate, was replaced by fresh silicic acid containing the acetate in the original concentration. 62 grams of vinyl acetate were obtained per liter of catalyst and per hour. The yield, calculated on the ethylene used, was 91% by weight.

(b) When operating as disclosed under (a), except that the acetic acid to be reacted, prior to entering the catalyst zone, was not brought into contact with the silicic acid containing sodium acetate and zinc acetate, the space-time yield decreased, already after about 10 days, to 35 grams of vinyl acetate per l./hour. At the same time, the yield, calculated on the ethylene used, decreased to 88% by weight.

What is claimed is:

1. In a continuous process for preparing vinyl acetate from ethylene, molecular oxygen and acetic acid in the gaseous state in the presence of catalyst consisting essentially of a palladium compound and an acetate selected from the group consisting of lithium acetate, sodium acetate, potassium acetate and a mixture of sodium acetate with zinc acetate, the improvement which comprises: continuously feeding to the reaction zone a gaseous mixture of said acetate and acetic acid, the amounts of the acetate ranging from 0.1 to 400 p.p.m. calculated on the acetic acid used.

2. A process as claimed in claim 1, wherein the catalyst additionally contains a Redox system.

3. A process as claimed in claim 1, wherein said acetate is an alkali metal acetate.

4. A process as claimed in claim 1, wherein the acetate fed is zinc acetate.

References Cited

UNITED STATES PATENTS

| 3,221,045 | 11/1965 | McKeon et al. | 260—497 |

FOREIGN PATENTS

| 615,596 | 9/1962 | Belgium | 260—497 |
| 966,809 | 8/1964 | Great Britain | 260—497 |
| 1,407,526 | 6/1965 | France | 260—497 |
| 981,987 | 2/1965 | Great Britain | 260—497 A |

JAMES A. PATTEN, Primary Examiner

R. D. KELLY, Assistant Examiner

U.S. Cl. X.R.

252—415, 428, 429, 430

Disclaimer 3,658,888.—*Lothar Hornig*, Frankfurt am Main, *Hans Fernholz*, Fischbach, Taunus, *Hans-Joachim Schmidt*, Frankfurt am Main, *Friedrich Wunder*, Florsheim (Main), and *Therese Quadflieg*, Kelkheim, Taunus Germany. PROCESS FOR PREPARING VINYL ACETATE. Patent dated Apr. 25, 1972. Disclaimer filed Sept. 21, 1973, by the assignee, *Farbwerke Hoechst Aktiengesellschaft, vormals Meister Lucius & Bruning*.

Hereby enters this disclaimer to claims 1 and 3 of said patent.

[*Official Gazette October 23, 1973.*]